US010628210B2

(12) United States Patent
Kim (10) Patent No.: US 10,628,210 B2
(45) Date of Patent: Apr. 21, 2020

(54) SYSTEM AND METHOD FOR ENABLING API INTEROPERABILITY

(71) Applicant: JPMorgan Chase Bank, N.A., New York, NY (US)

(72) Inventor: Julius H. Kim, West New York, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 107 days.

(21) Appl. No.: 16/004,502

(22) Filed: Jun. 11, 2018

(65) Prior Publication Data

US 2018/0357094 A1   Dec. 13, 2018

Related U.S. Application Data

(60) Provisional application No. 62/517,370, filed on Jun. 9, 2017.

(51) Int. Cl.
*G06F 9/54* (2006.01)
*G06F 9/46* (2006.01)
*G06F 3/0486* (2013.01)
*G06F 3/0481* (2013.01)

(52) U.S. Cl.
CPC ............ *G06F 9/461* (2013.01); *G06F 3/0486* (2013.01); *G06F 3/04817* (2013.01); *G06F 9/541* (2013.01)

(58) Field of Classification Search
CPC ..................................................... G06F 9/541
See application file for complete search history.

(56) References Cited

U.S. PATENT DOCUMENTS

| | | | | |
|---|---|---|---|---|
| 2007/0033167 | A1* | 2/2007 | Basu | G06F 16/951 |
| 2010/0242055 | A1* | 9/2010 | Aguilera | G06F 9/547 |
| | | | | 719/330 |
| 2011/0246253 | A1* | 10/2011 | Yu | G06Q 10/00 |
| | | | | 705/7.13 |
| 2012/0296929 | A1* | 11/2012 | Hossain | G06F 16/951 |
| | | | | 707/769 |
| 2013/0282748 | A1* | 10/2013 | Liensberger | G06F 9/44526 |
| | | | | 707/766 |
| 2016/0267153 | A1* | 9/2016 | Witkop | G06Q 10/00 |
| 2018/0284975 | A1* | 10/2018 | Carrier | G06F 9/451 |

* cited by examiner

*Primary Examiner* — Brian W Wathen
(74) *Attorney, Agent, or Firm* — Hunton Andrews Kurth LLP (57) ABSTRACT

The invention relates to providing API interoperability. An embodiment of the present invention is directed to increasing API productivity by chaining (or sequencing) APIs together to accomplish multiple operations. The innovative system enables APIs to be strung together, in a way that eliminates or reduces a user's need to visit and/or invoke multiple applications and/or APIs. An embodiment of the present invention is directed to expanding a traditional usage of point-to-point API invocation. The innovative system may define a classification protocol to enable API providers and/or creators to register an API by a command type (e.g., entitlement, query, data, etc.). Each command type may have a minimum set of mandatory operations that an API may be required to expose. By adhering to the contract, APIs may be handled generically, without knowing which system and/or app created the API.

20 Claims, 8 Drawing Sheets

SYSTEM AND METHOD FOR ENABLING API INTEROPERABILITY

CROSS REFERENCE TO RELATED APPLICATIONS

This application claims priority to U.S. Provisional Application 62/517,370, filed Jun. 9, 2017, the contents of which are incorporated herein in its entirety.

FIELD OF THE INVENTION

The invention relates generally to a system and method for enabling Application Program Interface (API) interoperability and more specifically to enabling APIs to be chained together in a user defined manner.

BACKGROUND OF THE INVENTION

Today, APIs typically service one type of response based on a single request or trigger point. Internal users perform various investigation related inquiries, and are required to access a number of applications to perform their day to day operations. Launching multiple applications, consolidating data, and analyzing data across applications are time consuming and further result in inefficiencies and delays. Currently, providers structure API data and define available calls in an ad hoc haphazard manner.

These and other drawbacks exist.

SUMMARY OF THE INVENTION

According to one embodiment, the invention relates to a system that provides API interoperability. The system comprises: an input that receives a trigger for a workflow execution; a memory component that stores and manages API data; a user interface that enables a user to chain together APIs; and an API controller, coupled to the input, the memory component and the user interface, configured to perform the steps of: registering a plurality of APIs, wherein each API is defined by a classification protocol that associates each API with a command type to generically categorize APIs based on business capability; identifying, via the user interface, a sequence of rules that chain API operations together; generating a workflow comprising the sequence of rules; and saving, in the memory component, the workflow comprising the sequence of rules.

According to another embodiment of the present invention, a method for implementing API interoperability comprises the steps of: registering, via an API controller, a plurality of APIs, wherein each API is defined by a classification protocol that associates each API with a command type to generically categorize APIs based on business capability; identifying, via the user interface, a sequence of rules that chain API operations together; generating a workflow comprising the sequence of rules; and saving, in a memory component, the workflow comprising the sequence of rules.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. According to the innovative system and method, APIs may be utilized more productively when they are "chained" together to accomplish more than one operation. API interoperability enables APIs to be strung together, in a way that eliminates or reduces a user's need to visit or invoke multiple applications and/or APIs within a desktop or other device. In addition, by chaining APIs together, users can better address specific business needs and goals in a more targeted manner. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to increasing API productivity by dynamically chaining (or sequencing) APIs together to accomplish multiple operations. Generally. Application Program Interface (API) represents a set of routines, protocols, and tools for building software applications. An API may specify how software components should interact. The innovative system enables APIs to be strung together, in a way that eliminates or reduces a user's need to visit and/or invoke multiple applications and/or APIs. An embodiment of the present invention is directed to expanding a traditional usage of point-to-point API invocation. The innovative system may define a classification protocol to enable API providers and/or creators to register an API by a command type (e.g., entitlement, query, data, etc.), or a business capability (e.g., confirmation, settlement, netting, etc.). Each command type, or capability, may have a minimum set of mandatory operations that an API system, provider, and/or application may be required to expose. By adhering to the contract, APIs may be handled generically, without knowing which system, provider and/or application created the API. The system further allows freedom for API authors to contribute to a common API library.

Figure 1:
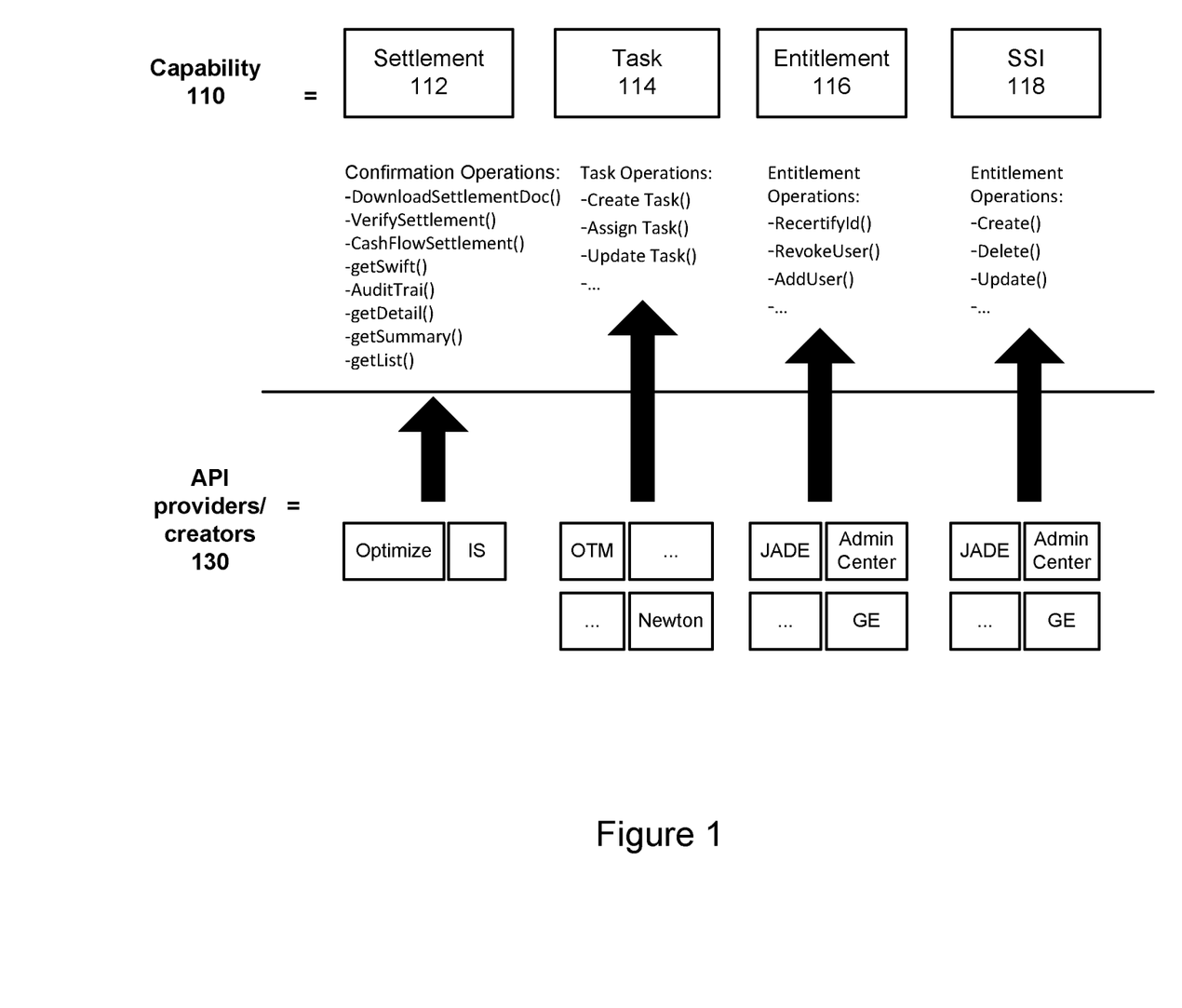
FIG. 1 is an exemplary system diagram that illustrates API interoperability, according to an embodiment of the present invention.

FIG. 1 is an exemplary system diagram that illustrates API interoperability, according to an embodiment of the present invention. An embodiment of the present invention is directed to providing structure to APIs that are offered where the structure may be defined by various business capabilities. An embodiment of the present invention is directed to a protocol that identifies a minimum set of operations associated with the capability. With the present invention, a user may chain together different types of API calls and define a specific workflow. An embodiment of the present invention may mix and match different types of capabilities to address specific business goals.

As shown in FIG. 1, Command Types 110 may include Settlement 112, Task 114, Entitlement 116 and Settlement Instructions (SSI) 118. Settlement 112 may support various settlement operations; Task 114 may support various task management related operations; Entitlement 116 may support various entitlement operations and SSI 118 may support various settlement instruction related operations. The corresponding operations may represent a minimum or subset of operations for each command type.

Command types may represent business capabilities. For example, Settlement 112 represents a settlement capability with various operations. As shown in FIG. 1, Settlement 112 may include confirmation operations such as download settlement document, verify settlement, cash flow, Swift, audit trail, detail view, etc. Other command types may be supported based on various business needs and goals. In addition, the command types may be updated, modified and/or otherwise customized for various applications, uses, etc.

FIG. 1 also illustrates API providers/creators 130 of the command types. API providers/creators 130 may be internal and/or external sources. For each command type, a corresponding set of providers that offer each capability may be identified. This provides a more generic view of each command type and corresponding operations.

Figure 2:
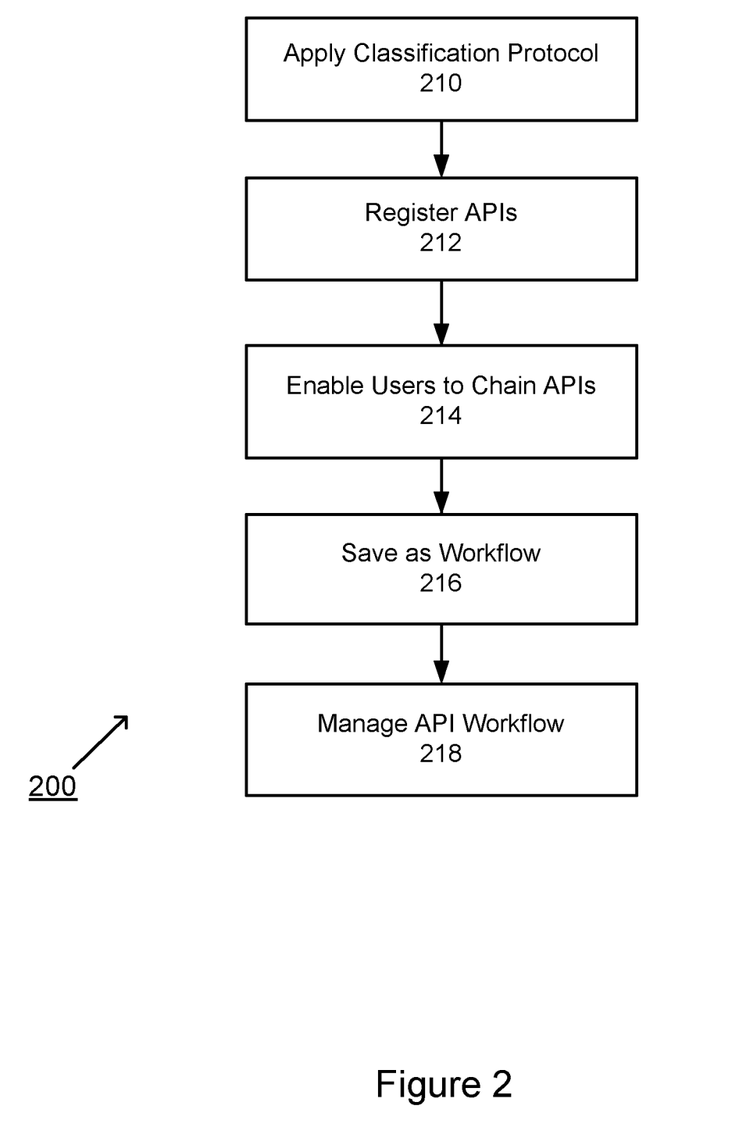
FIG. 2 is an exemplary flow diagram of a method for API interoperability, according to an embodiment of the present invention.

FIG. 2 is an exemplary flow diagram of a method for API interoperability, according to an embodiment of the present invention. At step 210, a classification protocol may be applied. At step 212, APIs may be registered. At step 214, users may chain APIs together. At step 216, the APIs may be saved as a workflow. At step 218, the user may manage the API workflows. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a classification protocol may be applied. An embodiment of the present invention may be directed to classification of APIs. A protocol of an embodiment of the present invention may define command types, allowing APIs to be generically categorized based on their business capability. The protocol of an embodiment of the present invention may generically classify APIs to extend across an entity, and beyond (e.g., Market utilities, clearing houses, single/multi-dealer platforms, etc.). As internal users may have various systems they need to interact with to complete day-to-day operations, the API interoperability provides users the flexibility to create workflows that span across institutions.

At step 212, APIs may be registered. An embodiment of the present invention is directed to auto discovery and/or self-awareness. For example, an API may support a callback API, providing information about itself (e.g., version, operations, required inputs, etc.), enabling a type of auto discovery. Additional details are provided in FIG. 4 below.

At step 214, users may chain APIs together. An embodiment of the present invention may be directed to an Intuitive Workflow Setup User Interface (UI). For example, a self-service workflow application may be provided to users so they can chain various API types together. In this example, users may drag and drop APIs together to form a chain/sequence of API invocations. In addition, users may save and trigger for future needs, uses and applications.

At step 216, the APIs may be saved as a workflow. The workflow may capture the chained APIs and then store the workflow for subsequent actions and execution. The workflow may be triggered by a user, schedule and/or other condition. An embodiment of the present invention is directed to API Interoperability that may be utilized by users to create their own workflows (e.g., gathering data from multiple sources with a single trigger, etc.). Such workflows may also be utilized to quickly define robotics automation scripts, invocable from symphony bots, and/or triggered from voice assistants (e.g., Alexa, Siri, etc.). An embodiment of the present invention may be directed to User Created Flows. For example, a user may decide what they need to solve a job (e.g., grab data from system x, system y, and system z; system will present users with data for analysis; user can then choose to invoke an action depending on requirement).

At step 218, the user may manage the API workflows. An embodiment of the present invention may be directed to an API Controller. The API Controller may be used to manage the API workflows, provide API Auto Discovery with API Providers, present users with APIs adhering to command type protocols, and trigger points for workflows.

Figure 3:
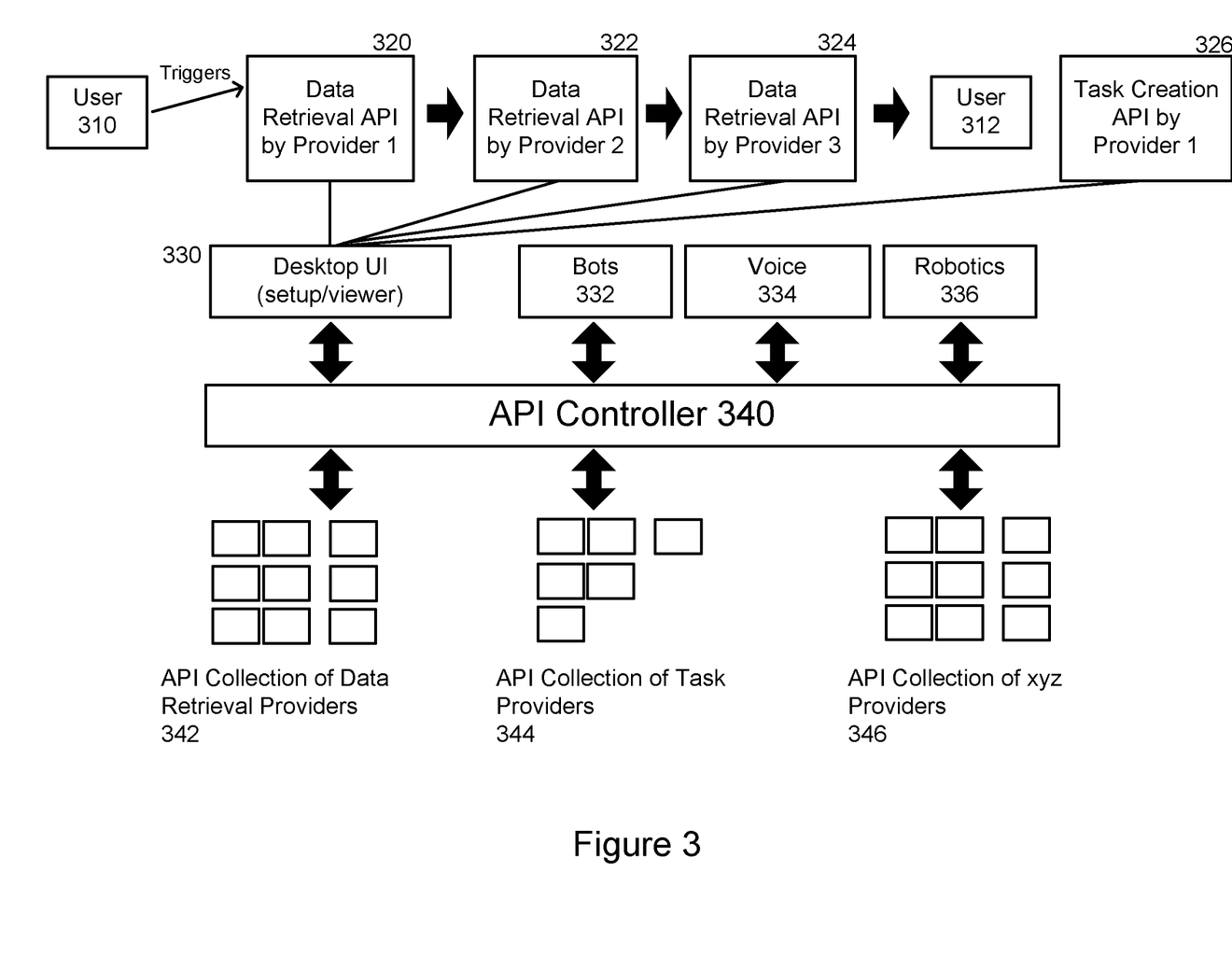
FIG. 3 is an exemplary diagram of a self-service API workflow, according to an embodiment of the present invention.

FIG. 3 is an exemplary diagram of a self-service API workflow, according to an embodiment of the present invention. An embodiment of the present invention is directed to API chaining. For example, a self-service workflow application may be provided to enable users to chain API types together. An API Controller may facilitate the actions needed to maintain and trigger workflows. FIG. 3 illustrates a sample use case where a user 310 may pull APIs together to create a workflow chain that grabs data from various systems for a specific trade. As shown in FIG. 3, User 310 may retrieve data from Provider 1, as shown by 320, from Provider 2, as shown by 322, and from Provider 3, as shown by 324. In this example, the client inquiry may involve an investigation into a particular settlement that invokes an exception management operation of the workflow. The exception management operation may investigate for a break or other error by accessing a first provider. If none is found, the system may then review associated trade data and details, e.g., trade number, life cycle, etc., via a second provider. The system may then examine the settlement system, via a third provider. The third provider may represent a system that handles settlements. This exemplary use case illustrates the invocation of three separate APIs. Accordingly, an embodiment of the present invention provides the ability to generate a workflow by chaining a sequence of APIs available through various different providers to address a particular request.

According to an embodiment of the present invention, a user, system and/or scheduler may trigger a workflow execution. Also, API Responses may be displayed to a user 312 where the user 312 may analyze data and choose to create a query.

In addition, a task may be created by Provider 1, as shown by 326. The task creation capability allows the user to create a task with relevant details, which may then be tracked within a workflow for that given business process. The task may capture a specific workflow step that may then be executed, tracked and assigned to a contact for follow-up actions. As shown in FIG. 3, a sequence of APIs may be triggered. API Controller 340 may provide a Desktop UI 330, Bots 332, Voice command functionality 334, Robotics 336 and various other features and functions. API Controller 340 may further access API collection of data retrieval providers 342; API collection of task providers 344 and API collection of various other providers 346.

According to an embodiment of the present invention, API Controller 340 may manage workflows, provide API Auto Discovery with API Providers, present users with API's adhering to command type protocols, and trigger point for workflows. According to an exemplary embodiment, API Controller 340 does not need to know detailed information about the API. In this example, APIs themselves may be self-describing and may be interrogated for more information on demand.

Figure 4:
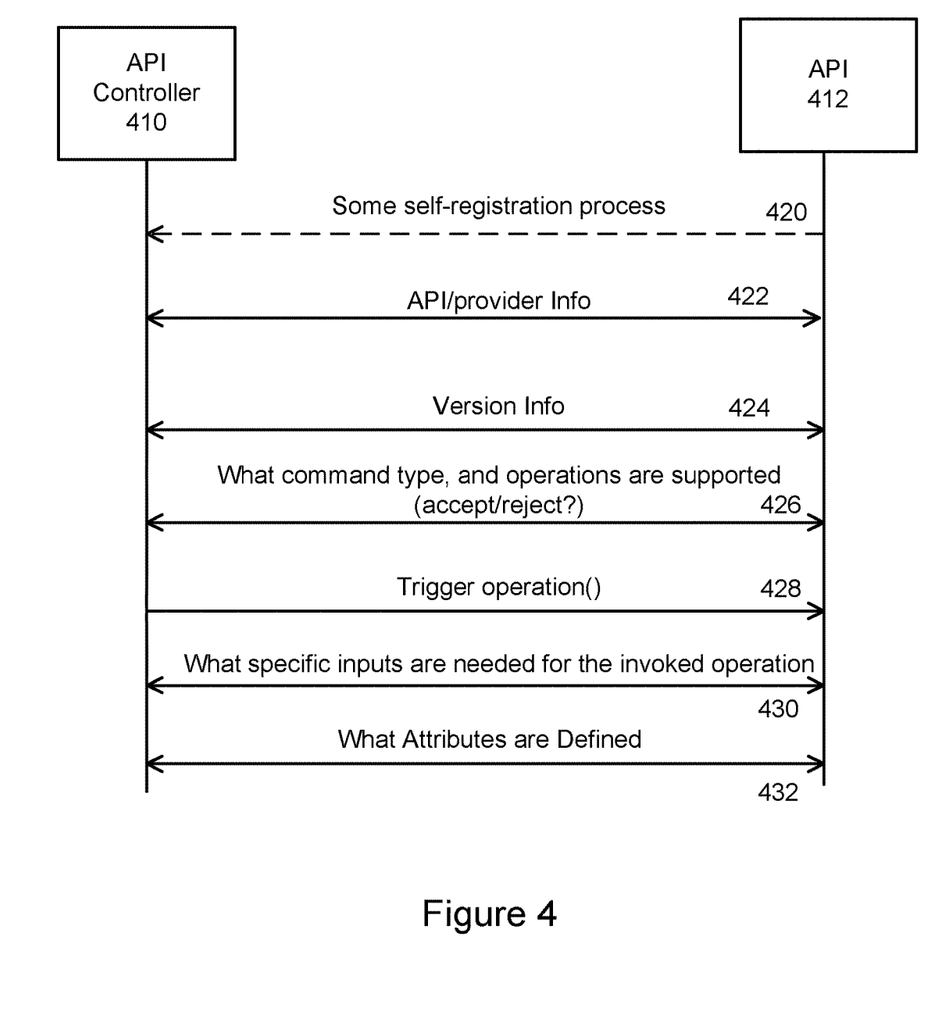
FIG. 4 is an exemplary illustration of API registration, according to an embodiment of the present invention.

FIG. 4 is an exemplary illustration of API registration, according to an embodiment of the present invention. An embodiment of the present invention is directed to empowering the API to be responsible for itself, when dealing with operations regarding what the API supports in terms of versions, operations, and input parameters required to carry out API invocation. For example, API registration may be provided by a centralized controller thereby making itself more widely available for invocation. In this example, the API is aware of who it is registered with. An embodiment of the present invention is directed to auto discovery and/or self-awareness. For example, an API may support a callback API, providing information about itself (e.g., version, operations, required inputs, etc.), enabling a type of auto discovery.

API Controller 410 may initiate a discovery feature for APIs. The discovery feature may identify description information and metadata, including inputs and outputs. Accordingly, actual metadata may drive the API interoperability features of an embodiment of the present invention. API inputs and outputs may provide additional insights into an expected API response.

In addition, API registration may involve identifying an endpoint to the API Controller 410. Upon endpoint identification, a self-registration process may interrogate the API for additional information. For example, there may be multiple API providers that provide the same command type. The interrogation process may obtain the inputs for each API provider. In this example, provider A may require a trade number and user identifier whereas provider B may require additional parameters.

As shown in FIG. 4, API 412 may initiate a self-registration process with API Controller 410. Self-registration process may involve registering a URL. API provider information may be communicated at 422. Version information may be shared at 424. Additional information, such as command type, supported operations and other data may be communicated at 426. A trigger operation may be received at 428. Specific information, such as inputs needed for the invoked operation, may be communicated in response, at 430. In addition, attributes that are defined as part of an API response schema may be identified, at step 432.

API 412 may communicate information to API Controller 410, including provider information and API description information. API may be self-describing so that a central store is not needed once it is plugged into an auto-discovery channel. A parameter transformation layer may convert parameters to necessary inputs for APIs. Also, APIs may belong to a command type category and support a minimal set of operations needed for the API classification (e.g., confirmation, query, entitlement, SSI, data, etc.).

Maintenance may include responding to heartbeat polling; support info (operate/help, etc.); and maintenance/downtime SLAs.

Administration may include administrative related operations (e.g., metrics, health, success rate, etc.); and registering and unregistering URL from an API controller.

According to an embodiment of the present invention, API Controller 410 may facilitate API invocation as well as API workflow invocation. API Controller 410 may also include a UI component that provides users with various functions, including administrative and self-service type capabilities.

According to an embodiment of the present invention, API Controller 410 may include responsibilities such as Maintenance, Monitoring, API Discovery, Administration and self-service UI and Trigger API/API Workflow. For example, maintenance may include assessing heartbeat polling. Monitoring may include notification or alert on different conditions; and reporting an end-to-end view of success, failure and/or other condition. API Discovery may include an interview process with APIs during a discovery process with each command type; and exposing registration URL for APIs to register themselves. Administration and Self-service UI may include workflow chain and facilitate API workflow. Trigger API/API workflow may involve creating triggers points to invoke API, or API workflows (e.g., event scenario, timer, scheduler, etc.).

Figure 5:
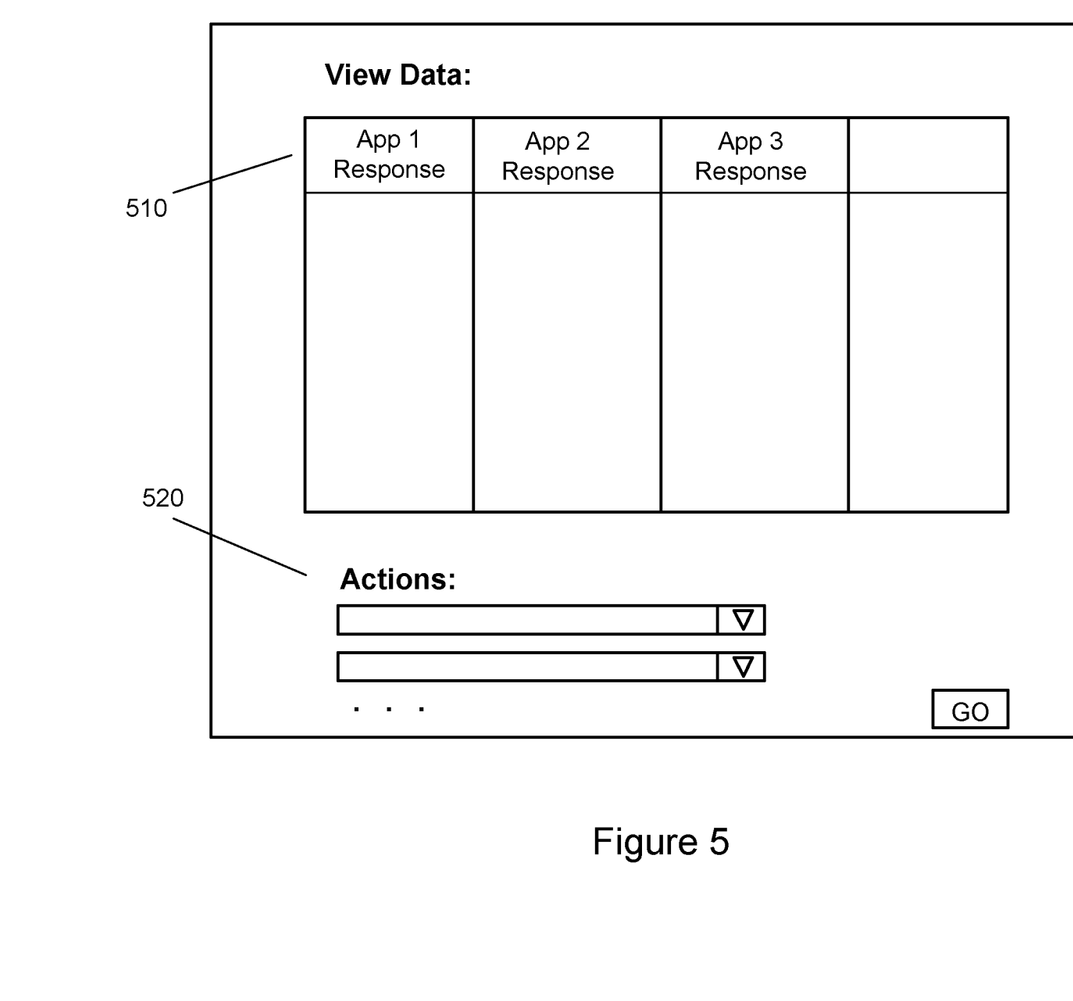
FIG. 5 is an exemplary illustration of a user interface, according to an embodiment of the present invention.

FIG. 5 is an exemplary illustration of a user interface, according to an embodiment of the present invention. As shown in FIG. 5, data may be displayed for each Application Response, represented by App 1 Response; App 2 Response and App 3 Response, as shown by 510. To further illustrate the responses, App 1 may represent response details for a FX trade API (e.g., counterparty name, value date, rate, notional, etc.); App 2 may represent response details for a FX confirmation statement (e.g., PDF statement that has been e-signed by client); App 3 may represent response details for any exceptions that exist for the given trade ID (e.g., trade exceptions details within other business process workflows). A user may select and initiate actions, as shown by an Action dropdown window, as shown by 520. The actions may be rendered dynamically based on the context of the responses. For example, specific actions may include launching into other applications/APIs, exporting details into a bundle, passing details onto next system/API as input, etc.

For example, the user interface may present users with response data, allow users to analyze, and perform actions if necessary. The user may view different responses and costs and then make decisions as well as modifications. The interface provides a loosely coupled interface from underlying APIs/applications. The interface further provides maximum flexibility and reduces the need of having many applications that offer workflows in a tightly coupled manner.

Figure 6:
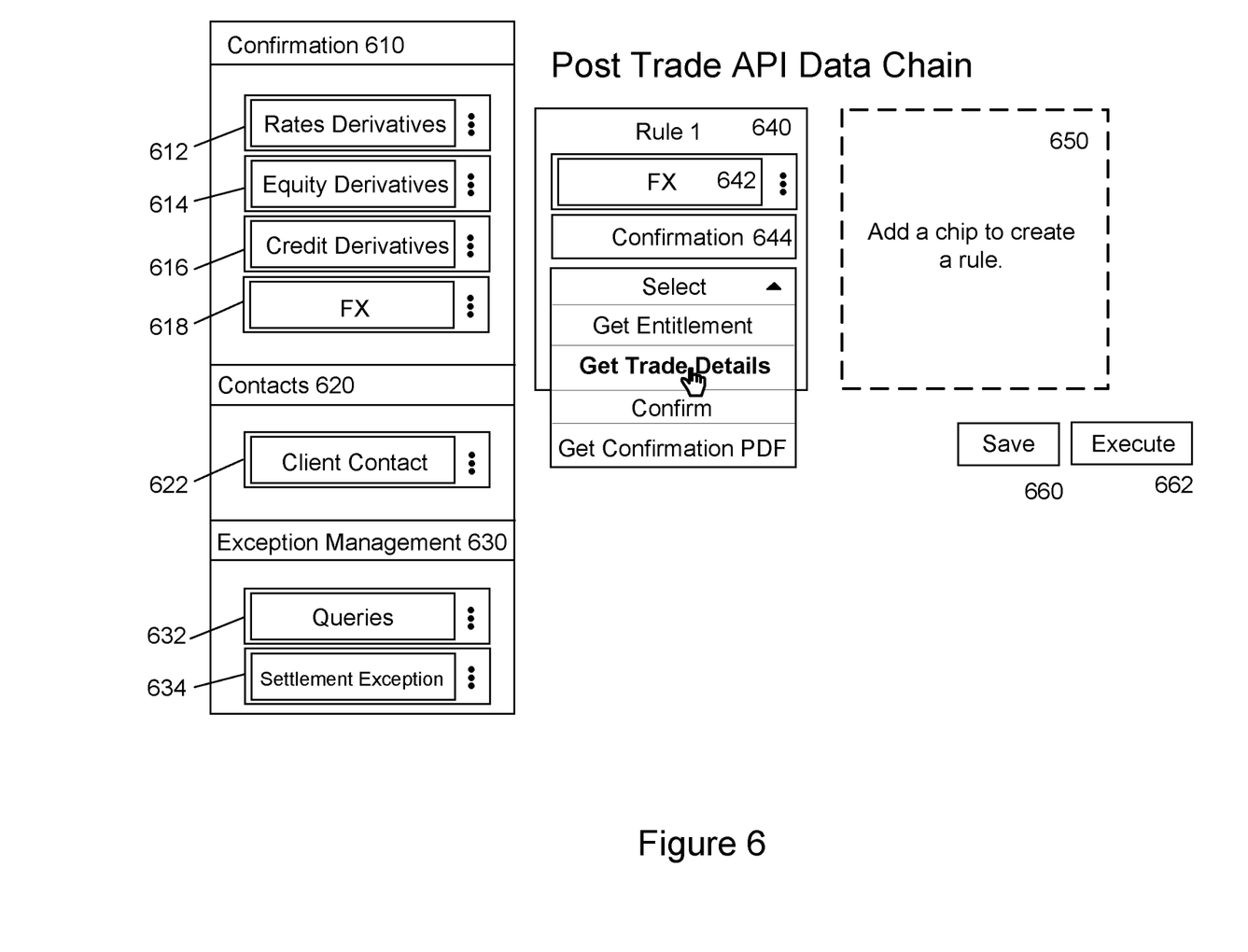
FIG. 6 is an exemplary screenshot of a user interface for API interoperability according to an embodiment of the present invention.

FIG. 6 is an exemplary screenshot of a user interface for API interoperability according to an embodiment of the present invention. FIG. 6 is an exemplary user interface for a Post Trade API Data Chain. In this example, groups of actions are shown by Confirmation 610, Contacts 620 and Exception Management 630. The actions may represent business capabilities. Confirmation 610 may include Rates Derivatives 612, Equity Derivatives 614, Credit Derivatives 616 and FX 618. Contacts 620 may include Client Contact 622. Exception Management 630 may include Queries 632, Settlement exceptions 634 and other types of exceptions. The groupings illustrated are exemplary and may include other actions. The actions may vary depending on the type of API data chain.

For example, a user may request trade details and determine whether an exception has been raised against a particular trade number. In this example, the user may request confirmation details regarding a foreign exchange (FX) trade.

As shown in FIG. 6, a user may initiate a first Rule, as shown by Rule 1, at 640. The user may drag and drop from the available actions. In this example, the user may select FX at 618 and drag to Rule 1, at 640. Rule 1 is identified as FX 642, Confirmation 644 and the user may select from Get Entitlement, Get Trade Details, Confirm and Get Confirmation PDF. Upon selecting "Get Trade Details," the user may also provide a trade identifier. Upon providing the details and selections, the user may continue to chain APIs and/or create additional rules at 650. Upon completion, the user may select Save at 660 and Execute at 662

Figure 7:
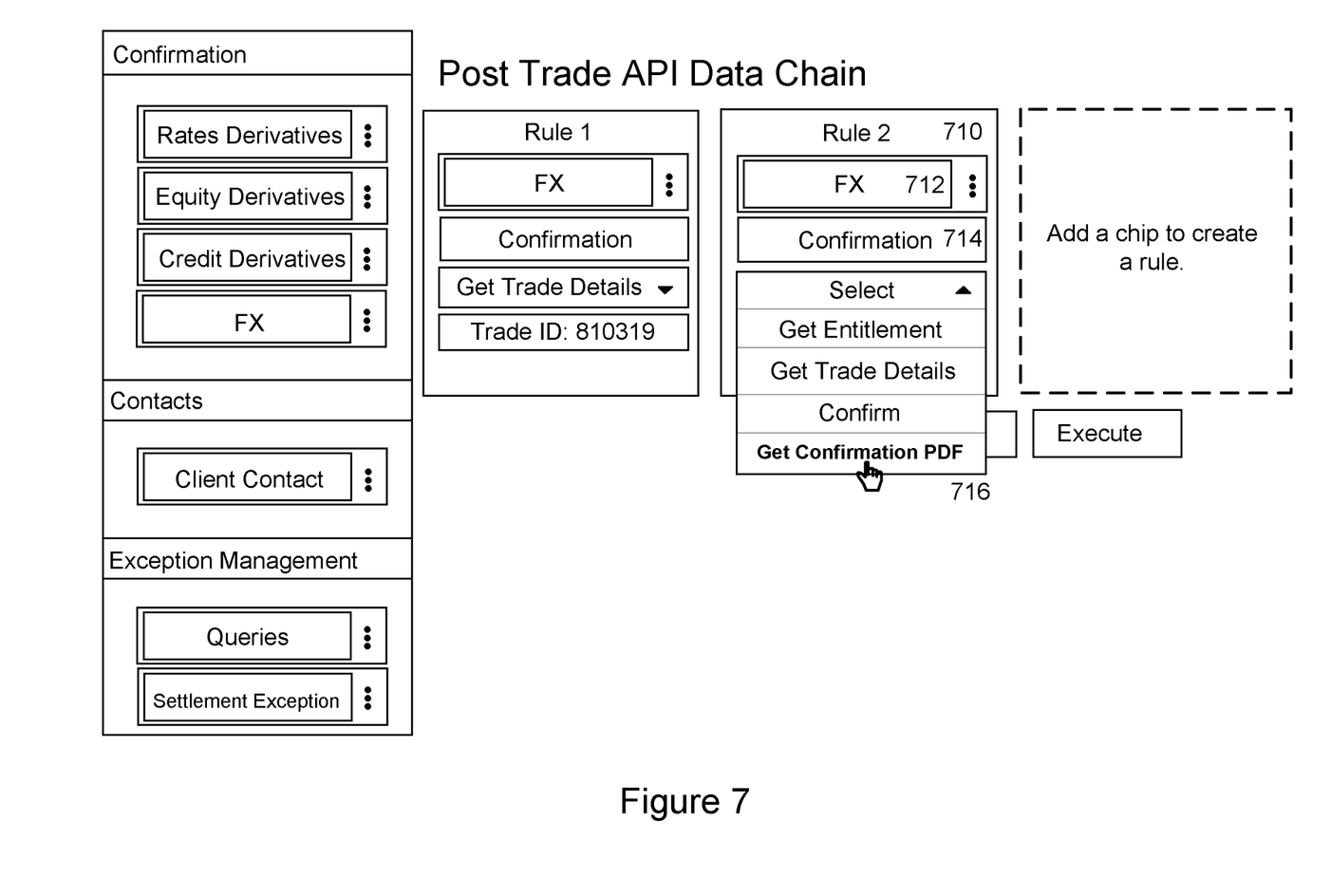
FIG. 7 is an exemplary screenshot of a user interface for API interoperability according to an embodiment of the present invention.

FIG. 7 is an exemplary screenshot of a user interface for API interoperability according to an embodiment of the present invention. In this example, a user may add a second rule at 710. In this example, the user selects a FX at 712, Confirmation at 714 and Get Confirmation PDF at 716. For trade identifier, the system may enable the user to use the trade ID of the previous action. The system may recognize that an output to Rule 1 may be an input to Rule 2, and therefore systematically carry the Rule 1 output as input parameters into Rule 2 (for matching attributes).

In this example, the user is requesting a Get Confirmation PDF operation where the system, on the backend, may perform a mapping of an output of the first API, and an input of the second API and thereby detect a trade identifier for the current operation from the previous operation. The system may then request whether the user wants to use/apply the trade identifier from the previous operation (e.g., the context passing of attribute values may repeatable for matching output/input parameters).

Figure 8:
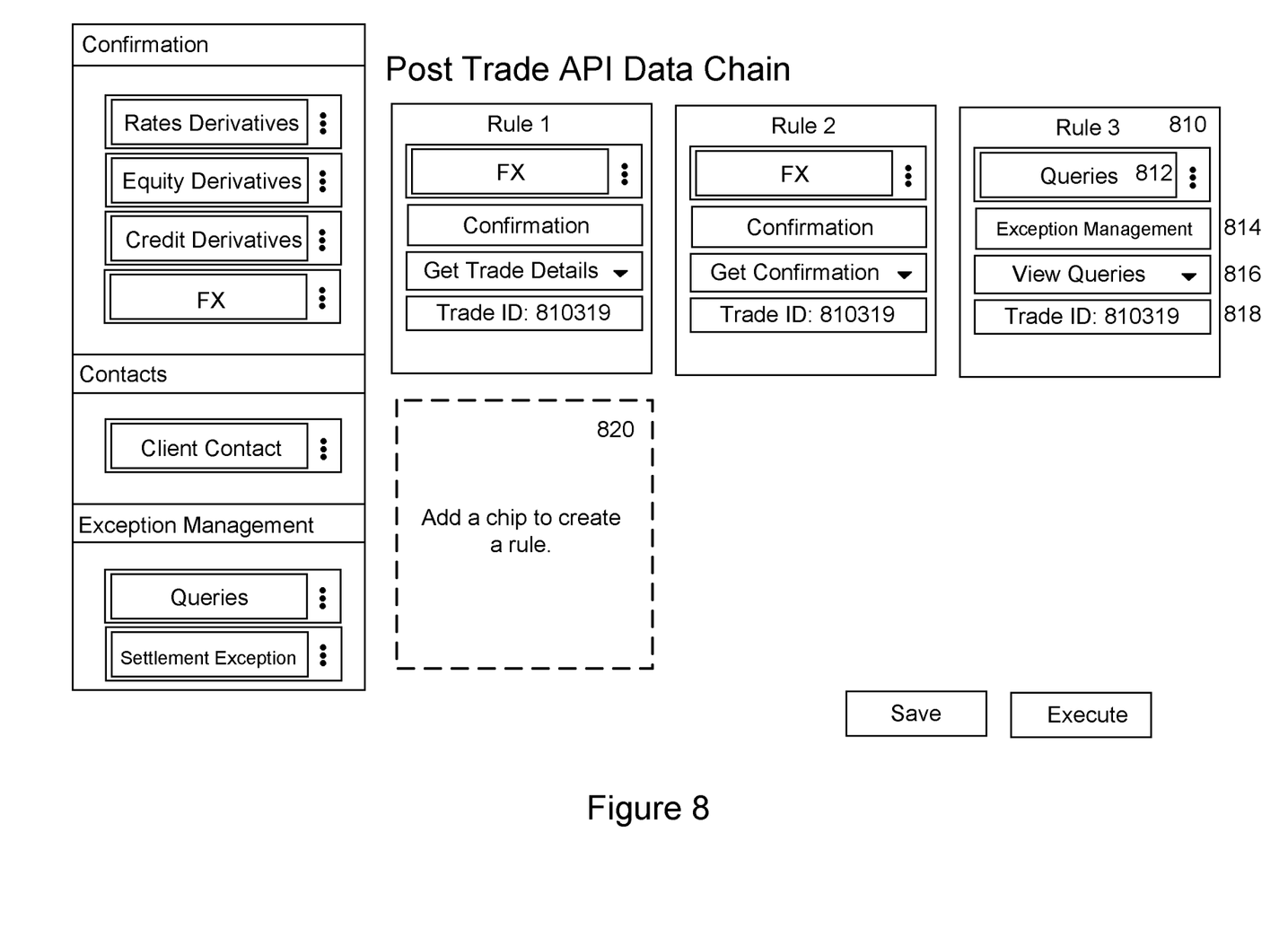
FIG. 8 is an exemplary screenshot of a user interface for API interoperability according to an embodiment of the present invention.

FIG. 8 is an exemplary screenshot of a user interface for API interoperability according to an embodiment of the present invention. In this example, a user may add a subsequent rule at 810. In this example, the user selects a Query 812, Exception Management 814 and View Queries operation at 816. For trade identifier 818, the system may enable the user to use the trade ID of the previous action. The system may recognize that an output to Rule 2 may be an input to Rule 3 and therefore provide a corresponding trade ID in response. In addition, the user may further specify a product, which may include an option specific to FX, based on the earlier rules. Upon providing the details and selections, the user may continue to chain APIs and/or create additional rules at 820.

The operations illustrated in FIGS. 6-8 are merely exemplary. Other operations may be provided and available for chaining Additional examples may utilize cases where users need to confirm whether client access was setup correctly. In this example, a chain that returns contact related data about the client, the user, as well as the entitlement setup for specific accounts ids may be validated for correctness. In another scenario, the user may want to ensure that trade settlement instructions were delivered as agreed by validating the trade settlement instruction, along with the swift payment details on the money transfer system. The flexibility for creating a data chain is not restricted to above examples, and may be further extended into many other use cases.

Other views may enable the user to analyze different types of API data. For example, the operations may be available as products, e.g., FX, rates, equities, etc. In this example, the user may view operations that relate to FX trades. Other types of views may include operations specific to a trading region, e.g., Asia, Europe, etc. Other views and operations may be specific to a type of user which may be based on user preference, profile, roles, entitlements, privileges, security, projects, etc.

The user may also view results from the sequence of Rules. For example, the user may select an "Execute" command from the user interface. For Rule 1, details may be provided for Confirmation FX Get Trade Details. This may include a separate UI or window that displays information such as: Strike/Deal Rate; RAG; Product; Fixing Date; Entity, Sell Amount, CPTY Name, CPTY Acronym, Status, Sell CCY, HRR Type, Trade Version, etc. For Rule 2, a link that opens confirmation PDF may be provided. For Rule 3, the results may be provided in a chart format that includes data related to Exception Management Queries View Queries may include information related to From, Subject, Last Notification Date, Task Age, Task Reference, Task Type, Client Legal Name and Client Identifier.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for implementing API interoperability, the system comprising:
   an input that receives a trigger for a workflow execution;
   a memory component that stores and manages API data;
   a user interface that enables a user to dynamically chain together APIs, wherein the user interface includes one or more business capabilities grouped by business capability type; and
   an API controller, coupled to the input, the memory component and the user interface, configured to perform the steps of:
   registering a plurality of APIs, wherein each API is defined by a classification protocol that associates each API with a command type to generically categorize APIs based on business capability;
   identifying, via the user interface, a sequence of rules that chain API operations together, wherein each rule comprising the sequence of rules includes a user selection of one or more of the business capabilities and for each selected business capability, a user selection of one or more operations associated with each selected business capability;
   generating a workflow comprising the sequence of rules; and
   saving, in the memory component, the workflow comprising the sequence of rules.

2. The system of claim 1, wherein the plurality of APIs are from a plurality of disparate API providers.

3. The system of claim 1, wherein the command types comprise a combination of settlement, task, data retrieve, entitlement and settlement instructions.

4. The system of claim 1, the API controller executes a self-registration process.

5. The system of claim 4, wherein the self-registration process comprises an exchange of API information, API provider information, and version information.

6. The system of claim 4, wherein the self-registration process comprises an exchange of command type, supported operations, trigger operation and inputs and outputs.

7. The system of claim 1, the sequence of rules comprises a first rule and a second rule, wherein at least one output of the first rule is used to automatically populate at least one input for the second rule.

8. The system of claim 7, wherein the first rule comprises one or more of: confirmation rule, contacts rule and exception management rule.

9. The system of claim 1, wherein the workflow is used to define an automation script.

10. The system of claim 1, wherein the sequence of rules are identified by dragging and dropping an interactive icon that represents a rule.

11. A method for implementing API interoperability, the method comprising the steps of:
registering, via an API controller, a plurality of APIs, wherein each API is defined by a classification protocol that associates each API with a command type to generically categorize APIs based on business capability;
identifying, via a user interface, a sequence of rules that chain API operations together, wherein each rule comprising the sequence of rules includes a user selection of one or more of the business capabilities and for each selected business capability, a user selection of one or more operations associated with each selected business capability;
generating a workflow comprising the sequence of rules; and
saving, in a memory component, the workflow comprising the sequence of rules.

12. The method of claim 11, wherein the plurality of APIs are from a plurality of disparate API providers.

13. The method of claim 11, wherein the command types comprise a combination of settlement, task, data retrieve, entitlement and settlement instructions.

14. The method of claim 11, the API controller executes a self-registration process.

15. The method of claim 14, wherein the self-registration process comprises an exchange of API information, API provider information, and version information.

16. The method of claim 14, wherein the self-registration process comprises an exchange of command type, supported operations, trigger operation and inputs and outputs.

17. The method of claim 11, the sequence of rules comprises a first rule and a second rule, wherein at least one output of the first rule is used to automatically populate at least one input for the second rule.

18. The method of claim 17, wherein the first rule comprises one or more of: confirmation rule, contacts rule and exception management rule.

19. The method of claim 11, wherein the workflow is used to define an automation script.

20. The method of claim 11, wherein the sequence of rules are identified by dragging and dropping an interactive icon that represents a rule.

* * * * *